United States Patent Office 3,325,430
Patented June 13, 1967

3,325,430
CALKING AND SEALING COMPOSITION CONTAINING BLOCK COPOLYMERS
Michael H. Grasley, Walnut Creek, Calif., assignor to Shell Oil Company, New York, N.Y., a corporation of Delaware
No Drawing. Filed Oct. 22, 1965, Ser. No. 502,395
5 Claims. (Cl. 260—25)

This invention concerns new compositions of matter particularly superior for sealing cracks, crevices, joints and leaks to make them water-proof. More particularly, it pertains to special compositions containing block copolymers as an elastomeric component, the compositions being characterized by their adhesiveness, flexibility and elastomeric properties.

Compositions for sealing cracks and other openings such as joints and the like are commonly prepared by compounding a drying oil such as linseed oil with a filler such as clay or talc to form a putty which can be pressed or forced into cracks and the like by ordinary hand pressure or from a calking gun.

With the advent, especially, of curtain wall construction techniques, the deficiencies of the well-known putties of the past were especially pointed up, since these traditional compounds did not fulfill the new requirements of tensile strength, elongation, elastic recovery, adhesion and long term dependability. As a result, modern sealants have been developed which are usually high solids elastomeric adhesives. Many of the common elastomers have been used as sealant vehicles which may be divided into two types, namely, those that develop elastomeric properties by "curing" through solvent evaporation and, secondly, those that develop elastomeric properties through a chemical reaction such as cross-linking or polymerization. While chemically curing sealants of the recent past have usually had the best performance, they are also the most expensive. The solvent type of sealants which have been recently developed may be inexpensive, but they are generally lacking in certain areas of performance.

It is an object of the present invention to provide improved solvent-type sealants. It is a particular object of the present invention to provide an improved elastomeric solvent-type sealant especially designed for the calking and sealing of joints and the like. Other objects will become apparent during the following detailed description of the invention.

Now, in accordance with the present invention, improved compositions are provided wherein the elastomeric component thereof is a block copolymer of the group consisting of polymers having the general configuration

A—B—A wherein each A is a poly(vinyl arene) block and B is a poly(conjugated diene) block, as well as hydrogenated derivatives of such block copolymers. The composition further comprises clearly limited and defined proportions of a mineral oil, a volatile hydrocarbon vehicle, two specially defined resins and two specially defined particulate fillers as the essential components, all as more particularly described hereinafter.

The following composition summarizes the classes of materials together with their proportions:

TABLE I

| Component: | Parts by weight |
|---|---|
| (A) Block copolymer | 100 |
| (B) Mineral oil extender | 0–50 |
| (C) Volatile hydrocarbon vehicle | 75–200 |
| (D) Resin of the group consisting of hydrogenated rosin, terpene resins, polymerized rosins, pentaerythritol esters of rosin, polyalkenes and mixtures thereof | 50–175 |
| (E) Alkylated dimethylol phenol-formaldehyde resin | 15–5 |
| (F) Coarse filler as defined hereinafter | 150–40 |
| (G) Fine filler as defined hereinafter | 10–30 |

Each of these components has been found to be essential in promoting the optimum combination of properties which is required of a satisfactory sealant. These properties may be summarized as follows:

TABLE II

Criteria for a single component elastomer sealant (I) In use:
   (1) Rheology should allow easy transfer from containers.
   (2) Rheology should be designed for application
      Non-sag for vertical joints.
      Self-leveling for horizontal joints.
   (3) Extrusion properties must be satisfactory at all working temperatures.
   (4) Tooling—Easily "tooled" to desired surface finish and level.
   (5) Product should not be toxic or have undesirable odor.
   (6) Product should be easily cleaned from tools and surfaces.
(II) Performance:
   (1) Excellent adhesion to building surfaces.
   (2) Develop good elastomeric properties.
   (3) Should reach a tack-free state rapidly.
   (4) Exhibit slight shrinkage.
   (5) Adequate cohesive strength for application— never more than adhesive strength.
   (6) No color change.
   (7) No adverse effect over ambient temperature range.
   (8) Not affected by sunlight, water, oxygen, ozone, wind pressure, dirt.
   (9) Good chemical resistance.
   (10) Non-staining and non-corrosive.
   (11) Maintain desirable properties over estimated life.
   (12) Performance should comply with applicable specifications.

The block copolymers forming the important elastomeric component of the present composition have the general configuration

A—B—A

If the copolymer is not hydrogenated, the blocks A comprise poly(vinyl arene) blocks while the block B is a poly(conjugated diene) block. The blocks A normally have average molecular weights as determined by osmotic molecular weight methods as they are related to intrinsic viscosity of between about 8,000 and 45,000, while the conjugated diene polymer block has average molecular weights between about 35,000 and 150,000. If the copolymers are hydrogenated the molecular weight ranges remain in roughly the same ranges. Two preferred species of such block copolymers include those having the block configuration polystyrene-polybutadiene-polystyrene and polystyrene-polyisoprene-polystyrene as well as their hydrogenated counterparts. The hydrogenated counterpart of the second of the above defined block copolymers is of especial interest, not only because of its high stability but because of the elastomeric nature of the hydrogenated mid-section which resembles that of an ethylene-propylene rubber while the end blocks either remain as poly(vinyl arene) blocks or if hydrogenated become saturated blocks typified by cyclohexane polymer blocks. Thus, the fully hydrogenated preferred species has the block configuration polycyclohexane-[ethylene-propylene copolymer]-polycyclohexane.

These particular block copolymers have the unique feature of attaining the stress-strain properties of an elastomer without the requirement that it be subjected to curing vulcanization. Thus, they are sharply differentiated from other rubbers such as natural rubber, polybutadiene, SBR and the like which require vulcanization in order to attain satisfactory stress-strain properties. Consequently, sealant compositions of the present invention represent a hybrid between the two general types of elastomeric caulking compounds heretofore developed in that it "cures" by solvent evaporation but does not require vulcanization or chemical cross-linking such as is necessary with polyurethanes and the like.

The compositions of the invention may function satisfactorily without any mineral oil extender but it has been found that the oil functions in an unexpected manner not only to plasticize, soften and tackify the composition but also creates a consistency especially suitable for rapid escape of the volatile solvent utilized for viscosity purposes. On the other hand, the proportion of oil which may be incorporated is strictly limited, since if proportions in excess of 50 phr. (parts by weight per hundred parts by weight of block copolymer), then poor adhesion to the surfaces being sealed results.

The type of mineral oil utilized for this purpose is not especially critical but should be one which does not volatilize under the conditions of service. Consequently, it is preferred that it have a boiling point above about 550° F. and a viscosity between about 40 and 250 SSU at 210° F. Such oils are often referred to as "processing and rubber extending oils" and have aromatic contents varying from about 10% to about 50%.

One of the important components of the composition may be regarded as a "temporary" component in that it is a relatively volatile liquid hydrocarbon of such a character that the other components may be thinned thereby but from which it will readily escape over a period of about several weeks after application of the sealant into its service position. Consequently, it is necessary that the liquid hydrocarbon boil between about 100° C. and 175° C. Such hydrocarbons are especially typified by toluene, xylene and mixtures of hydrocarbons boiling within this general range, often referred to an "mineral spirits." If the boiling range is below the minimum specified, the solvent is released too rapidly and surface hardening of the remaining components may occur before the sealant is properly leveled into position. On the other hand, if the boiling range is extended beyond that specified then it is too slow to release properly and the composition may be subject to flow or sagging, especially when it is placed in a vertical position.

One of the major components of the composition under consideration comprises a resin. It would, of course, be convenient to utilize only a single resin in such compositions but this has not been possible when employing the subject class of block copolymers. Ideally, a resin may be regarded as a physical softener which acts as an intermolecular lubricant for the elastomer component and performs a number of important functions including increasing plasticity, tack, workability and the wetting of pigments and fillers. However, it is immediately apparent to any formulator confronted with a bewildering array of proprietary resinous products that these may not be used indiscriminately. The choice is sharply narrowed by requirements for polarity, particular molecular structure, chemical reactivity and molecular weight, all as they are related to the elastomeric component. Moreover, the molecular weight must be chosen to provide suitable viscosity, tensile and tear strength as well as melting point.

It was found that ordinary phenol-formaldehyde resins were not compatible with the block copolymers. Polymerized petroleum hydrocarbons were also unsatisfactory but terpene polymers were found to be adequate as were polymerized rosin and hydrogenated rosin together with pentaerythritol esters of rosin and polyalkenes. The most desirable class of materials comprised the hydrogenated rosins (either gum rosin or wood rosin) which unexpectedly result in dramatically increased elongation of the compositions under consideration. Furthermore, of course, the saturated nature of the hydrogenated rosins make them highly resistant to oxidation, discoloration and changes in solubility characteristics when exposed to air and sunlight.

While all of these factors are satisfied by the particular class of resinous materials described immediately above, it was found in the course of developing the compositions of this invention that if these resins were the sole resinous component the compositions were lacking in one essential respect, namely, in adhesion to the surfaces being sealed. Sealant adhesion to such surfaces is a stringent requirement and usually the most difficult to meet. It has been noted hereinbefore that the oil content is critical in this respect and was therefore restricted to the recited range of 0–50 phr. Even when so restricted, however, the resulting compositions containing only the one resin of the class given hereinbefore did not exhibit proper adhesion. Consequently, some enhancement of adhesion was required by a further modification of the composition. This was found in the use of a critically limited amount of alkylated dimethylol phenol-formaldehyde resins. The use of this class of oil-soluble resins was investigated over much wider concentration ranges. However, it was noted that when proportions larger than those specified (15–50 phr.) were employed the resulting compositions including the block copolymer exhibited poor physical properties indicative of incompatibility. However, when utilized within the restricted range specified there was a dramatic increase in sealant adhesion to all types of surfaces investigated. The alkylated dimethylol phenol-formaldehyde resins have the general configuration as follows:

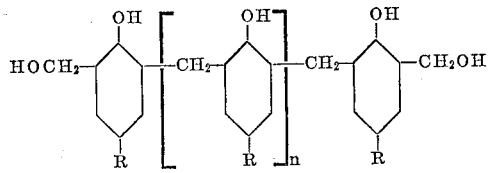

In the above general formula (which is not to be considered limiting but illustrative), the groups R represents alkyl radicals having from 4 to 9 carbon atoms each. These impart the oil solubility required for compatibility in the present system. The average molecular weight of the resins lies between about 350 and 1,500 while the methylol content is preferably between about 5 and 20% by weight. While the methylol groups are normally regarded as being situated on the terminal phenolic groups, the methylol content may be increased without molecular weight increase by replacement of one of more of the R alkyl radicals with methylol radicals. Alternatively, methylol radicals may supplement the alkyl radicals instead of replacing them. In the usual commercially available dimethylol resins of this class, the alkyl radicals are believed to be in positions para to the hydroxyl groups of each phenol radical. The preferred resins of this class have softening points (Nagel) of 80–95° C., specific gravities at 25° C. of between about 1.02 and 1.04 and acid numbers about 30 and 40.

In order to be effective commercially, and competitive with other similar products, it is essential that the entire composition be relatively low in cost, while still maintaining satisfactory physical properties for the sealing requirements as detailed hereinbefore. This may be achieved primarily by the use of fillers, but here again the choice, which immediately may appear to be extremely large, turns out to be relatively limited. Moreover, it was discovered that no one filler satisfied all the requirements of the compositions containing the subject block copolymers but, in fact, two fillers were found to be essential. It was found possible to employ limited amounts in the order of 150–400 parts by weight based on one hundred parts by weight of the block copolymer of fillers comprising alkaline earth metal carbonates, oxides and clays having relatively coarse particle diameters between 5 and 75 microns. However, if larger proportions were employed, then the physical properties of the resulting compositions degenerated, particularly insofar as elasticity and cohesive strength were concerned. Therefore, it was necessary to utilize in combination with the relatively coarse filler other fillers having extremely finely divided particles in the order of 0.005 and 1 micron. Depending on the particular filler employed and its particle size, this finely divided filler should be present in amounts between about 10 and 300 phr. and may comprise silicas, particularly fumed silicas, metallic oxides and alkaline earth metal carbonates. The fumed silicas being of such fine particle size (in the order of 0.005–0.02) are used only in small proportions up to about 30 phr. However, for the somewhat larger but still small sized alkaline earth metal carbonates and oxides wherein the particle size vary from about 0.025 to 1 micron proportions in the order of 150 and 275 phr., may be employed. However, if attempts are made to entirely replace the relatively coarse fillers having a diameter of 5–75 microns with the finer fillers, it is unexpectedly found that the percent of shrinkage of the entire composition rises sharply and results in unsatisfactory service.

Summarizing the above compositions, the following table gives both the broad range of permissable proportions of each of the essential components and also in a separate column the preferred range of proportions thereof.

TABLE III

| Component | Parts By Weight | |
| --- | --- | --- |
| | Broad Range | Preferred Range |
| (A) Block copolymer | 100 | 100 |
| (B) Extending oil | 0–50 | 20–35 |
| (C) Volatile hydrocarbon | 75–200 | 85–125 |
| (D) Rosin-type resin | 50–175 | 110–155 |
| (E) Dimethylol phenolic resin | 15–50 | 20–40 |
| (F) Coarse filler | 150–400 | 175–225 |
| (G) Fine filler | 10–300 | 150–275 |

In addition to the essential components discussed in detail above, other optional materials may be employed for improvement, modification or stabilization of these compositions. For example, antiozonants and antioxidants may be utilized. A preferred class of antioxidants comprise the nickel dialkyldithiocarbamates. Specific compounds in this group include nickel dibutyldithiocarbamate, nickel diamyldithiocarbamate and nickel diisooctyldithiocarbamate. These may be supplemented by the presence of alkylated phenols and their derivatives as well as by aromatic amines. Phenolic antioxidants are especially desirable, of which one of the most effective is the class of trialkyl-substituted tri(alkyl hydroxybenzyl) benzenes. Specifically, an especially desirable antioxidant within this group is 1,3,5-trimethyl - 2,4,6-tri(3,5-di-tertiarybutyl-4-hydroxybenzyl) benzene. These antioxidants and antiozonants are to be used in the usual additive amounts, namely, between about 0.25% and about 1% each. Coloring materials and masking agents may be utilized such as carbon blacks, titania etc., as long as they do not interfere with the effective set of physical properties obtained by the special combination of components discussed above.

The physical testing of the subject sealants presents a problem since they are in effect a hybrid between the solvent release type of sealant and the curative sealants. Consequently, the tests such as those detailed by the American Standard's Test A116.1–1960 apply only when they are modified to take this hybrid character into account. The most realistic type of testing is field testing wherein the sealants are placed in a working position such as in the sealing of curtain wall sections and observed for a period of time. The following compositions have been tested under such circumstances.

TABLE IV

| Component | Parts by Weight | |
| --- | --- | --- |
| | Sample A | Sample B |
| (A) Polystyrene-polybutadiene-polystyrene block molecular weights 14,000–67,000–14,000 | 100 | 100 |
| (B) Naphthenic mineral oil, 53 SSU at 210° F. | 32 | |
| (C) Toluene | 105 | 100 |
| (D) Hydrogenated rosin | 145 | 125 |
| (E) Tert. butyldimethylol phenol-formaldehyde resin 14% w. methylol content | 25 | 25 |
| (F) Calcium carbonate 25–45 microns average particle size | 200 | 200 |
| (G) Calcium carbonate 0.05 micron average particle size | 250 | 250 |

Sealing of this curtain wall building was effected by filling the joints between the concrete slabs, the joint being about ½ inch deep and varying from ¼ to ¾ inches in width and 12 feet high. The sealant had good working and handling properties and did not show evidence of sagging. Periodic inspection after installation showed that the sealant had cured well, i.e., the solvent had evaporated satisfactorily and no shrinkage problems were evident. There was no sign of adhesion failure and all indications implied that the subject building sealant compositions were superior to other solvent-type sealants and unlike most of the latter can be used successfully in moving joint applications in place of the more expensive chemically curing sealants.

I claim as my invention:

1. A calking composition for sealing crevices, cracks leaks, joints and the like to make them waterproof comprising an intimate mixture of:

Parts by weight
(a) a block copolymer of the group consisting of polymers having the general configuration A—B—A wherein each A is a poly(vinyl arene) block having an average molecular weight between 8,000 and 45,000, and B is a poly(conjugated diene) block having an average molecular weight between 35,000 and 150,000, and hydrogenated derivatives thereof __ 100
(b) a mineral oil having a boiling point above about 550° F. and a viscosity of 40 to 250 SSU at 210° F. _____ 0–50
(c) a liquid hydrocarbon boiling between about 100° C. and 175° C. _____ 75–200
(d) a resin of the group consisting of hydrogenated rosin, terpene resins, polymerized rosin, pentaerythritol esters of rosin, polyalkenes and mixtures thereof _____ 50–175
(e) an alkylated dimethylol phenol-formaldehyde resin having an average molecular weight between 350 and 1,500, a methylol content between 5% and 20% and alkyl substituents of 4–9 carbon atoms each _____ 15–50
(f) a filler of the group consisting of alkaline earth metal carbonates, oxides and clays having average particle diameters between about 5 and 75 microns _____ 150–400
(g) and a filler of the group consisting of silicas, alkaline earth metal oxides and carbonates having average particle diameters between about 0.005 and 1 micron _____ 10–300

2. A composition according to claim 1 wherein
(a) the block copolymer has the configuration polystyrene-polybutadiene-polystyrene.

3. A composition according to claim 1 wherein the filler (g) is an alkaline earth metal carbonate having an rage particle diameter between about 0.025 and 1 micron and is present in an amount between about 150 and 5 parts by weight.

4. A composition according to claim 1 comprising:

| | Parts by weight |
|---|---|
| (a) a block copolymer having the configuration polystyrene-polybutadiene-polystyrene wherein the polystyrene blocks have average molecular weights between about 10,000 and 35,000 and the polybutadiene block has an average molecular weight between about 35,000 and 100,000 | 100 |
| (b) a mineral oil having a viscosity between about 45 and 100 SSU at 210° F. | 20–35 |
| (c) a liquid hydrocarbon boiling between about 105° C. and 150° C. | 85–125 |
| (d) hydrogenated rosin | 110–155 |
| (e) an alkylated dimethylphenol-formaldehyde resin having a molecular weight between about 350 and 1,500, a methylol content between about 10 and 16% by weight, and wherein the alkyl groups thereof have from 4 to 6 carbons each | 20–40 |
| (f) an alkaline earth metal carbonate having an average particle diameter between about 20 and 50 microns | 175–225 |
| (g) an alkaline earth metal carbonate having an average particle diameter between about 0.006 and 0.1 | 150–275 |

5. A composition according to claim 1 comprising:

| | Parts by weight |
|---|---|
| (a) a block copolymer having the configuration polystyrene-polybutadiene-polystyrene, the average molecular weight of the polystyrene blocks being about 14,000 each and the average molecular weight of the polybutadiene blocks being about 64,000 | 100 |
| (b) a mineral oil having a viscosity of about 50–60 SSU at 210° F. | 30–32 |
| (c) toluene | 100–105 |
| (d) hydrogenated resin | 135–145 |
| (e) a butylated dimethylol phenol-formaldehyde resin having a molecular weight between about 350 and 1,500 and a methylol content of about 14% by weight | 25–35 |
| (f) a calcium carbonate having an average particle diameter of 25–45 microns | 190–215 |
| (g) and a calcium carbonate having an average particle diameter between about 0.04 and 0.1 micron | 225–265 |

References Cited

UNITED STATES PATENTS

| 2,140,375 | 12/1938 | Allen et al. | 23—66 |
| 2,198,223 | 4/1940 | Muskat et al. | 23—66 |
| 2,708,192 | 5/1955 | Joesting et al. | 117—122 |
| 2,963,387 | 12/1960 | Herr et al. | 260—846 |
| 3,239,478 | 3/1966 | Harlan | 260—27 |

FOREIGN PATENTS

| 137,614 | 6/1950 | Australia. |
| 572,994 | 11/1945 | Great Britain. |
| 649,975 | 2/1951 | Great Britain. |
| 876,697 | 9/1961 | Great Britain. |

OTHER REFERENCES

Megson: Phenolic Resin Chemistry, 1958, pages 248–250 relied upon.

DONALD E. CZAJA, *Primary Examiner.*

F. McKELVEY, *Assistant Examiner.*